US010240530B2

(12) United States Patent
Deleau et al.

(10) Patent No.: US 10,240,530 B2
(45) Date of Patent: Mar. 26, 2019

(54) CONTAINER FOR A SYSTEM FOR STORING AND RESTORING HEAT, COMPRISING A DOUBLE WALL FORMED FROM CONCRETE

(71) Applicant: IFP Energies nouvelles, Rueil-Malmaison (FR)

(72) Inventors: Fabrice Deleau, Pierre-Benite (FR); Florence Richard, Residence les Cliquets (FR); David Teixeira, Croissy sur Seine (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 55 days.

(21) Appl. No.: 15/650,552

(22) Filed: Jul. 14, 2017

(65) Prior Publication Data
US 2018/0016984 A1    Jan. 18, 2018

(30) Foreign Application Priority Data
Jul. 15, 2016   (FR) ..................................... 16 56804

(51) Int. Cl.
*F02C 7/10* (2006.01)
*F02C 1/00* (2006.01)
*F02C 6/16* (2006.01)
(Continued)

(52) U.S. Cl.
CPC ................ *F02C 7/10* (2013.01); *F02C 1/005* (2013.01); *F02C 6/16* (2013.01); *F02C 6/18* (2013.01);
(Continued)

(58) Field of Classification Search
CPC ......... F28D 20/0056; F28D 2020/0086; Y10S 165/042; Y02E 60/142; F02C 7/10;
(Continued)

(56) References Cited

U.S. PATENT DOCUMENTS

| | | | |
|---|---|---|---|
| 4,405,010 A * | 9/1983 | Schwartz | F28D 20/0056 165/10 |
| 5,615,738 A * | 4/1997 | Cameron | F28F 9/22 165/103 |

(Continued)

FOREIGN PATENT DOCUMENTS

| | | |
|---|---|---|
| EP | 1 857 614 B1 | 3/2010 |
| EP | 2 447 501 A2 | 5/2012 |

(Continued)

OTHER PUBLICATIONS

Search Report and Opinion issued in corresponding French priority application No. 1656804 dated Mar. 10, 2017 (8 pages).

*Primary Examiner* — Mark A Laurenzi
*Assistant Examiner* — Shafiq Mian
(74) *Attorney, Agent, or Firm* — Fitch, Even, Tabin & Flannery LLP

(57) ABSTRACT

The invention relates to a container (200) for a heat storage and restitution system, comprising a vessel in which a gas is circulating in order to be cooled or heated. The vessel is limited by a first jacket formed from concrete (203) surrounded by a thermally insulating layer (206), which is itself surrounded by a steel shell (204). The vessel comprises at least two modules (210), each comprising a double wall formed from concrete and a perforated base (205) limiting at least two volumes (217 and 216) which are each capable of containing a fixed bed of particles of a material for storage and restitution of heat (207). The modules are disposed one above the other in a centered manner such that the double wall formed from concrete forms the first jacket formed from concrete (203) and a second jacket formed from concrete (215).

21 Claims, 10 Drawing Sheets

(51) Int. Cl.
*F02C 6/18* (2006.01)
*F28F 21/04* (2006.01)
*F28D 17/00* (2006.01)
*F28D 20/00* (2006.01)

(52) U.S. Cl.
CPC ....... *F28D 17/005* (2013.01); *F28D 20/0056* (2013.01); *F28F 21/04* (2013.01); *F05D 2220/62* (2013.01); *F05D 2260/211* (2013.01); *F05D 2260/234* (2013.01); *F28D 2020/0082* (2013.01); *F28D 2020/0086* (2013.01); *Y02E 20/14* (2013.01); *Y02E 60/142* (2013.01); *Y02E 60/15* (2013.01)

(58) Field of Classification Search
CPC .... F02C 6/16; F02C 6/18; F02C 1/005; F05D 2260/211; F05D 2260/234; F05D 2220/62
See application file for complete search history.

(56) References Cited

U.S. PATENT DOCUMENTS

| | | | | |
|---|---|---|---|---|
| 9,970,715 | B2* | 5/2018 | Howes | F28D 20/0056 |
| 2012/0018116 | A1* | 1/2012 | Mathur | C09K 5/063 |
| | | | | 165/10 |
| 2015/0328612 | A1* | 11/2015 | Bazer-Bachi | B01J 8/08 |
| | | | | 422/187 |
| 2018/0017213 | A1* | 1/2018 | Deleau | F02C 6/16 |
| 2018/0179955 | A1* | 6/2018 | Apte | F28D 20/0056 |

FOREIGN PATENT DOCUMENTS

| | | | |
|---|---|---|---|
| FR | 2 998 556 A1 | 5/2014 | |
| FR | 3051549 A1 * | 11/2017 | ................ F02C 6/16 |
| WO | 2015/150104 A1 | 10/2015 | |

\* cited by examiner

CONTAINER FOR A SYSTEM FOR STORING AND RESTORING HEAT, COMPRISING A DOUBLE WALL FORMED FROM CONCRETE

CROSS-REFERENCE TO RELATED APPLICATION

Reference is made to French Patent Application No. 16/56.804, filed Jul. 15, 2016, which is hereby incorporated herein by reference in its entirety.

FIELD OF THE INVENTION

The present invention relates to heat storage, in particular large volume containers for storing heat such as those used for storing heat using compressed air (CAES, for "Compressed Air Energy Storage"), in particular for the storage of energy using compressed air of the AACAES type ("Advanced Adiabatic Compressed Air Energy Storage"), in which air is stored and the heat generated is stored independently.

DESCRIPTION OF THE PRIOR ART

The majority of primary energy sources such as gas, oil, or coal, can be stored easily and thus can be used to produce electricity on demand, in contrast to the production of electricity from renewable energy sources such as wind energy or solar energy. In order to supply electricity on demand produced by this type of renewable energy, it is necessary to store the electricity. However, it is very difficult to store electricity in large quantities. It is, however, possible to convert the electricity into energy termed "intermediate energy" and to store it in the form of potential, kinetic, chemical or thermal energy.

Electricity may, for example, be stored in the form of compressed air. This is what is carried out in CAES systems in which a type of energy, typically electricity, which is to be used at a given time, is stored in the form of compressed air. For storage, the electrical energy drives air compressors, and to draw on the energy, the compressed air drives turbines which are connected to a generator of electricity. The compressed air is typically stored in an underground cavern, a porous rock formation, an exhausted oil or gas field, or any other compressed air reservoir which may be a pressurized tank. The yield from this solution is not optimal, because part of the energy from the compressed air is in the form of heat which is not used with the heat produced during compression of the air being discarded. Furthermore, the stored air is heated to expand the air, which again reduces the energy yield of the system.

A number of variations of this CAES system currently exist. In particular, the following systems and processes may be mentioned:

ACAES ("Adiabatic Compressed Air Energy Storage"), in which the air is stored at high temperature due to the compression. However, that type of system requires a specific, bulky and expensive storage system (adiabatic storage).

AACAES ("Advanced Adiabatic Compressed Air Energy Storage"), in which the air is stored at ambient temperature and the heat due to compression is also stored, separately, in a heat storage system, TES ("Thermal Energy Storage»). The heat stored in the TES system is used to heat the air before it is expanded.

In accordance with some designs envisaged for AACAES, the heat is stored using a heat transfer fluid in order to store the heat obtained from compression of the air and to restore it to the air before it is expanded by means of heat exchangers. As an example, patent application EP 2 447 501 describes an AACAES system in which oil, used as the heat transfer fluid, moves in a closed circuit in order to exchange heat with the air.

In accordance with other designs envisaged for AACAES, the heat is stored using static solids contained in one or more containers. As an example, the heat is stored in a material in the form of particles in a fixed bed disposed in one or more containers, and through which the air to be cooled is passed. This heat is restored to the cold air which passes through the fixed bed in the opposite direction during a discharge phase (expansion of air).

The container is advantageously used to store energy in the form of compressed air of the AACAES type, but it is not limited to this application. Thus, the container may be suitable for any application using a system for storing and restoring heat requiring a large heat storage capacity, and which requires a high resistance to temperatures and pressures. By way of example, fields of application other than that of the storage of energy in the form of compressed air may be cited, such as the field of metallurgy, for example in the context of recovery and restitution of heat from blast furnace fumes, the field of marine energy storage, etc.

A major difficulty arises when designing compressors for heat storage systems which can be operated at high pressures, of the order of several tens of bars, typically at pressures of up to 65-85 bar, and which can function at high temperatures, typically several hundred degrees C., possibly up to 750° C.

In order to resist high temperatures as well as high pressures, TESs generally comprise large cylindrical tanks formed from concrete filled with a heat storage material, which comprise thick walls of pre-stressed concrete which may be reinforced with steel, and which may have a variety of structures for reinforcing the walls, for example of the strut type, in order to resist the stresses exerted on the walls due to the internal pressure.

As an example, a TES is known in the context of adiabatic compressed air storage which can be operated at very high temperatures, for example up to 650° C., and at pressures of up to 65 bar, as described in patent EP 1 857 614 B. That storage system comprises a double structure formed by two capsules nested one in the other, with an outer pressure capsule formed from pre-stressed concrete and an inner capsule formed from heat-resistant concrete and containing the heat storage material, for example stacked ceramic elements. That system is based on a mechanical contribution by the concrete wall in order to contain the internal pressure. This forces production to be on-site with the fabrication of pre-stressed concrete because factory production is not possible. Furthermore, systems of this type, involving the construction of very thick (more than 1 m, for example) cylindrical concrete walls, give rise to problems regarding the engineering and are expensive and complicated to make. Finally, this system cannot be used to address the pressure constraints envisaged today in TES systems, which are in fact of the order of 125 bar, or even 300 bar.

A heat storage system is also known which can store heat at pressures of more than 3-4 bar, which can be used in quasi-adiabatic compressed air storage systems such as that described in the patent FR 2 998 556 A1. A container of that type has refractory concrete walls surrounded by a steel shell with a thermal insulator being provided between the steel shell and the concrete walls. The sandwich structure formed by the refractory concrete wall/insulator/steel shell assembly can be used to reduce thermal losses by insulating the thermal storage material, which means that the temperature of the steel wall can be reduced, thereby limiting degradation of the characteristics of the steel, meaning that the skin temperature of the steel shell can be limited, improving safety, and is able to contain the pressure prevailing in the container as a function of the thickness of the steel shell. The container of FR 2 998 556 A1 also comprises grids for holding the heat storage material which may be disposed at different heights in the container, which also act as struts, limiting the load being exerted on the walls. That configuration can be used to maintain the storage material at different heights in the container, thereby contributing to limiting the stress being exerted on the walls, and also allowing for better distribution of material in the tank, which improves the interaction of the air with the storage material.

During air charging and discharging operations, the structure is subjected to thermal expansions, in particular at the level of the grids. In order to absorb these expansions, the heat storage system of FR 2 998 556 A1 provides for the grids to be fixed to the concrete walls via rings associated with chains, preventing the generation of mechanical stresses during thermal expansion.

However, because of the large forces involved in storing the material, it is difficult to deploy a container of that type comprising grids fixed via a system of rings and chains which is poorly suited to the quantity and weight of the material used, in particular in AACAES type applications in which several hundred tons of material in the form of particles are stored in reservoirs with a capacity of about 200 m$^3$ to 1000 m$^3$. Furthermore, a fixing system to that type is bulky.

SUMMARY OF THE INVENTION

The present invention is a novel implementation of heat storage systems which are adapted to high pressure conditions, which can typically function at pressures of up to the order of 300 bar, and which are adapted to moderate temperature conditions, typically maximum temperatures of the order of 300° C.

The present invention also pertains to a container of the AACAES type which is capable of receiving a heat storage material in the form of particles in a fixed bed.

In particular, the present invention provides a TES container which can both resist high internal pressures linked to gas under pressure which may be more than 100 bar and even up to 300 bar, and at the same time resist the loads exerted by the heat storage material which is a fixed bed of particles in the container.

The present invention also limits the problems linked to thermal expansion during operations for storage and restitution of heat, to reduce the container fabrication costs and to facilitate assembly of the container.

Thus, in order to accomplish at least one of the benefits set out above, inter alia, and in order to overcome at least some of the disadvantages of the prior art discussed above, in a first aspect, the present invention is a container for a heat storage and restitution system, comprising a vessel comprising means for injecting and withdrawing a gas to be cooled or heated, the vessel being surrounded by a first jacket formed from concrete surrounded by a thermally insulating layer with the insulating layer being surrounded by a steel shell, and the vessel comprising at least two modules with each module comprising at least:
a first volume limited by a first side wall formed from concrete and a perforated base;
a second volume surrounding the first volume and limited by the first side wall, by a second side wall formed from concrete, and by the perforated base;

the first and second volumes each containing a fixed bed of particles of a material for the storage and restitution of heat; and the modules being disposed one above the other in a centered configuration such that the second side walls form the first jacket formed from concrete and the first side walls form a second jacket formed from concrete, the first and second jackets formed from concrete and the insulating layer not being pressure-tight.

In accordance with a first embodiment, the perforated base is formed from metal.

In accordance with this first embodiment, the perforated base of each module may comprise a single grid formed from metal hounded by the second side wall formed from concrete, and supporting the first side wall being formed from concrete.

Alternatively, the perforated base of each module may comprise a first grid formed from metal bounded by the first side wall formed from concrete and a second grid formed from metal bounded by the first and second side walls formed from concrete.

In accordance with a second embodiment, the perforated base of each module is formed from concrete.

In accordance with the second embodiment, the modules may advantageously be modules formed from concrete monoblocs.

Advantageously, the material for the storage and restitution of heat is in the form of particles formed from concrete.

Preferably, the container is in the form of a column with the first and second side walls being formed from cylindrical concrete of the modules.

Preferably, the container comprises pressure-equalizing holes in the first and second jackets formed from concrete.

Each module may also comprise a gas homogenization zone placed below the perforated base and free from any heat storage material.

Advantageously, the thermal conductivity is in the range:
0.1 to 2 W·m$^{-1}$·K$^{-1}$ for the jackets formed from concrete,
0.01 to 0.17 W·m$^{-1}$·K$^{-1}$ for the insulating layer, and
20 to 250 W·m$^{-1}$·K$^{-1}$ for the steel shell.

Advantageously, the thickness of the insulating layer is such that, when in use to store heat, the temperature of the steel shell is less than or equal to 50° C., and in which the insulating layer is preferably selected from a layer of rock wool, perlite, glass wool, cellular glass, an air gap, and more preferably it is a layer of rock wool.

The container may comprise in the range 2 to 12 modules formed from concrete.

The vessel preferably has a volume in the range 200 m$^3$ to 1000 m$^3$.

The container may comprise a plurality of vessels assembled in series and/or in parallel.

In accordance with a second aspect, the invention concerns a system for the storage and restitution of heat, comprising at least one container in accordance with the invention.

In accordance with a third aspect, the invention concerns an AACAES type compressed air energy storage facility comprising:

a compression system for compressing air during a compression phase;

a system for the storage and restitution of heat in accordance with the invention in order to store the heat from the air compressed during the compression phase and to restore the heat to the compressed air during an expansion phase;

a final reservoir for storing air compressed by the compression system and cooled by the system for the storage and restitution of heat; and a device for expanding the compressed air obtained from the final storage reservoir during the expansion phase.

In accordance with one embodiment, the final reservoir has a volume ranging from 1000 m$^3$ to 7000 m$^3$ and the vessel of the at least one container of the system for the storage and restitution of heat has a volume ranging from 200 m$^3$ to 1000 m$^3$, the system for the storage and restitution of heat preferably comprises at least three containers.

In accordance with a fourth aspect, the invention concerns a method for assembling a container in accordance with the invention, comprising:

installing the steel shell minus a covering cap at the container assembly site, the steel shell being disposed on a support;

assembling the concrete modules, installing the insulating layer and filling the modules with the heat storage material, by successively inserting modules into the steel shell in a centered configuration in order to form the first jacket formed from concrete and the second jacket formed from concrete; and closing the container by assembling the steel shell with a steel cap which has already been thermally insulated, preferably by welding.

In accordance with one embodiment, the first volume and the second volume of the module are filled with the heat storage material in order to produce two fixed beds of particles once the module has been inserted into the steel shell.

Alternatively, the first volume and the second volume of the module may be filled with the heat storage material in order to produce two fixed beds of particles before inserting the module into the steel shell.

Other aims and advantages of the invention will become apparent from the following description of particular exemplary embodiments of the invention, given by way of non-limiting examples; the description is made with reference to the accompanying drawings described below.

BRIEF DESCRIPTION OF THE DRAWINGS

In the FIGS., the same reference numerals designate identical or analogous elements.

DETAILED DESCRIPTION OF THE INVENTION

The present invention concerns a container for a heat storage and restitution system (TES) which has a structure reinforced by a double jacket formed from concrete.

Figure 1:
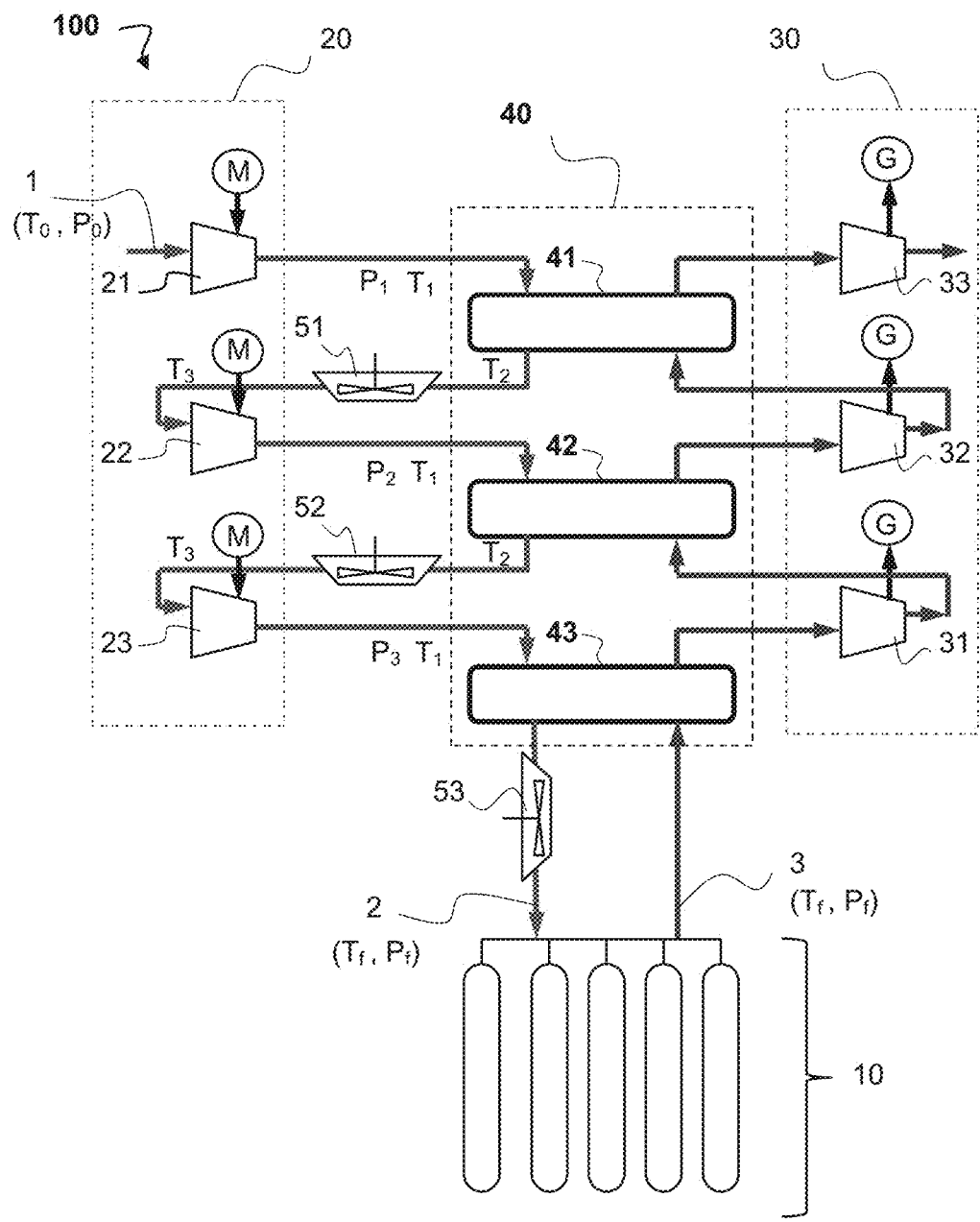
FIG. 1 is a diagram illustrating the principle of an AACAES process in which a system for the storage and restitution of heat (TES) is implemented in accordance with one non-limiting embodiment of the invention.

FIG. 1 diagrammatically illustrates the principle of the operation of an AACAES facility comprising a system for storage and restitution of heat (TES) in accordance with the invention. The features of the TES container in accordance with the invention are not shown in this FIG. and are described below, in particular in relation to FIGS. 2 to 15.

In FIG. 1, the AACAES facility 100 comprises a system 20 for compressing air, a system 30 for expanding air, a system for storage and restitution of heat of the air which is denoted TES, and a final reservoir 10 for storing the compressed air.

The TES in accordance with the invention is adapted to any type of gas, in particular air. In this case, the incoming air used for compression may be taken from the ambient air, and the outgoing air after expansion may be released into the ambient air. In the remainder of the description, only the variation with compressed air will be described. However, any gas other than air may be employed in the TES container in accordance with the invention.

The compression train 20 comprises three compression stages with each stage comprising one of compressors 21, 22, and 23. The number of compression stages is a function of the technologies and the performances of the compressors and preferably comprises one to six compressors. The compression train is necessary in order to obtain the desired pressure for the air which is stored in the reservoir 10. Preferably, the pressure of the compressed air in the final reservoir 10 is in the range 50 bar to 300 bar. The compressors are, for example, driven by a motor M, in particular an electric motor.

The air expansion system 30 comprises three stages of turbines. The three turbines 31, 32 and 33 are used to expand the air and generate the electrical power. The turbines are typically connected to an electricity generator G. The number of expansion stages is preferably identical to that of the compression train.

Typically, the number of turbines equals the number of TES containers, and the number of compressors is greater than or equal to the number of TES containers.

One TES container per compression stage is necessary. Thus, the TES 40 comprises three containers 41, 42, and 43. Each container comprises a vessel defining a volume comprising at least one fixed bed of particles of a heat storage material, and is designed to resist high pressures and moderate temperatures. The heat storage material is capable of storing heat from the air which passes through the container and which is brought into contact with the material, and of restoring the stored heat to the air passing through the container at another time. These containers are described in detail below.

During the compression phase, also termed the storage phase or charging phase, heated air produced by compression in a compressor 21, 22, and 23 is respectfully admitted into a TES container 41, 42, or 43 and leaves again at a low temperature in order to undergo the subsequent compression stage or be stored in the final reservoir 10. Thus, the air 1 enters the compressor 21 at a temperature $T_0$ and at a pressure $P_0$, for example at 25° C. (ambient temperature) and at atmospheric pressure. The air is compressed in the compressor 21, and heated due to the compression, and leaves at a temperature $T_1$ and at a pressure $P_1$ which are higher than the initial values ($T_0$, $P_0$), for example at approximately 260° C. and approximately 6 bar. The compressed and heated air then enters the container 41 and passes through the heat storage material with which it exchanges heat, then leaves it cooled to a temperature $T_2$, for example at approximately 100° C. This cooled air may optionally be further cooled in a ventilation device 51 placed at the outlet from the TES container 41, in order to reach a temperature $T_3$ which is lower than the temperature $T_2$, approaching ambient temperature. The temperature $T_3$ is, for example, equal to approximately 50° C. The AACAES facility can then comprise at least one supplemental air cooling device which differs from the TES containers, for example of the ventilator type, in order to reduce the temperature of the air leaving each TES container, and preferably comprises as many supplemental cooling devices, for example of the ventilator type, as there are TES containers, each being positioned on the air line leaving the TES container and entering the compressor of a compression stage or entering the final reservoir 10. The air, optionally cooled in the ventilator 51, is then sent to the compressor 22 to undergo compression again and to increase the temperature concomitantly, and leaves it at a pressure $P_2$ which is higher than the pressure $P_1$, for example at a pressure of approximately 30 bar, and at the temperature $T_1$. The air at the temperature $T_1$ and pressure $P_2$ is then sent to the TES container 42 where it is cooled in the same manner as in the container 41. The air leaves the container 42 at the temperature $T_2$, and is optionally cooled further in the ventilator 52 to the temperature $T_3$, before being sent to the last compressor 23. The compressed air at the outlet from the compressor 23 is at a pressure $P_3$ which is higher than the pressure $P_2$, for example at approximately 125 bar, and is at the temperature $T_1$. It is sent to the TES container 43, then optionally to a ventilator 53, and finally is sent (air 2) and stored in the final air storage reservoir 10, at a storage temperature $T_f$ which is substantially equal to the outlet temperature from the last TES container 43 or possibly at the temperature $T_3$ at the outlet from the last ventilator 53, for example equal to approximately 50° C., and preferably equal to ambient temperature, and a storage pressure $P_f$ which is substantially equal to the pressure $P_3$ at the outlet from the last compressor 23 (mod the pressure drop following passage through the TES container and optionally through the ventilator), for example approximately 125 bar.

During the expansion phase, also known as the withdrawal phase or discharge phase, the cold air produced during the expansion in a turbine is admitted into the TES container 41, 42, and 43 for transfer of the stored heat thereto. Thus, the air 3 leaving the reservoir 10 at the storage temperature $T_f$ and at the storage pressure $P_f$ enters the TES container 43 where it is reheated in contact with the heat storage material which restores the heat collected during the storage phase. The reheated air is then sent to the turbine 31, undergoes an expansion and because of this, it is also cooled. At the outlet from the turbine 31, the cooled air is sent to the TES container 42 for reheating therein, like in the container 43, then again undergoes an expansion and a cooling by passage through the turbine 32. Before it enters the third stage for expansion by the turbine 33, the air leaving the turbine 32 is sent to the TES container 41 in order to undergo a final reheating.

Because of the TES, the heat formed during the air compression phase is advantageously stored in the TES containers and restored during the compressed air expansion phase, thereby ensuring an optimized yield for the facility by limiting the loss of heat during the process. In order to maximize the yield and guarantee an adiabatic system, the TES container has to limit the transfer of heat to the exterior as much as possible. Each TES container preferably has a volume in the range 200 m³ to 1000 m³, typically selected as a function of the energy to be stored. The TES container in accordance with the invention may be used irrespective of the size of the AACAES facility. The volume of the container and the number of containers are selected as a function of the envisaged size of the AACAES system. The flow rate of the air entering and leaving the TES container depends on the stage at which the container is positioned, and in particular depends on the pressure, and is preferably in the range 20 to 200 m³/h. The temperature of the storage material is preferably in the range from ambient temperature, i.e. approximately 25° C., to 300° C., preferably in the range from ambient temperature to 260° C.

In the facility illustrated in FIG. 1, the TES container 43, that is the TES container from which air is sent to the final reservoir 10, is the heat storage device which imposes the most constraints on the scaling of the TES. In fact, it is that which supports the highest stresses linked to compression of the air. In the example given and illustrated in FIG. 1, the TES container 43 has the following characteristics:

it is capable of containing air at a temperature with a maximum of approximately 260° C.;

it is capable of being operated at a maximum pressure of 125 bar;

it contains 336 m³ of a heat storage material;

the heat storage material it contains has a density of 2400 kg/m³ which, for example, produces a bulk density of 1200 kg/m³ assuming a void percentage of 50%;

the storage material it contains is in the form of beads 10 mm in diameter.

Several compressed air storage units are shown in FIG. 1 which form the final air storage reservoir 10, although this does not constitute a limitation. The compressed air storage reservoir 10 may in fact be composed of one or more air storage units, for example one or more tanks, a system of pipework, or one or more underground caverns. The total volume of the reservoir 10 may be in the range 1000 m³ to 7000 m³ in the case of modestly sized AACAES facilities, and may be up to 100000 m³, depending on the envisaged applications.

The AACAES system comprising a TES container in accordance with the invention is not limited to the example of FIG. 1. Other configurations may be envisaged including a different number of compression stages and/or expansion stages, the use of reversible means for compression and expansion in order to limit the number of devices used in the system and thus to provide a saving in weight and volume of the system, etc.

Figure 2:
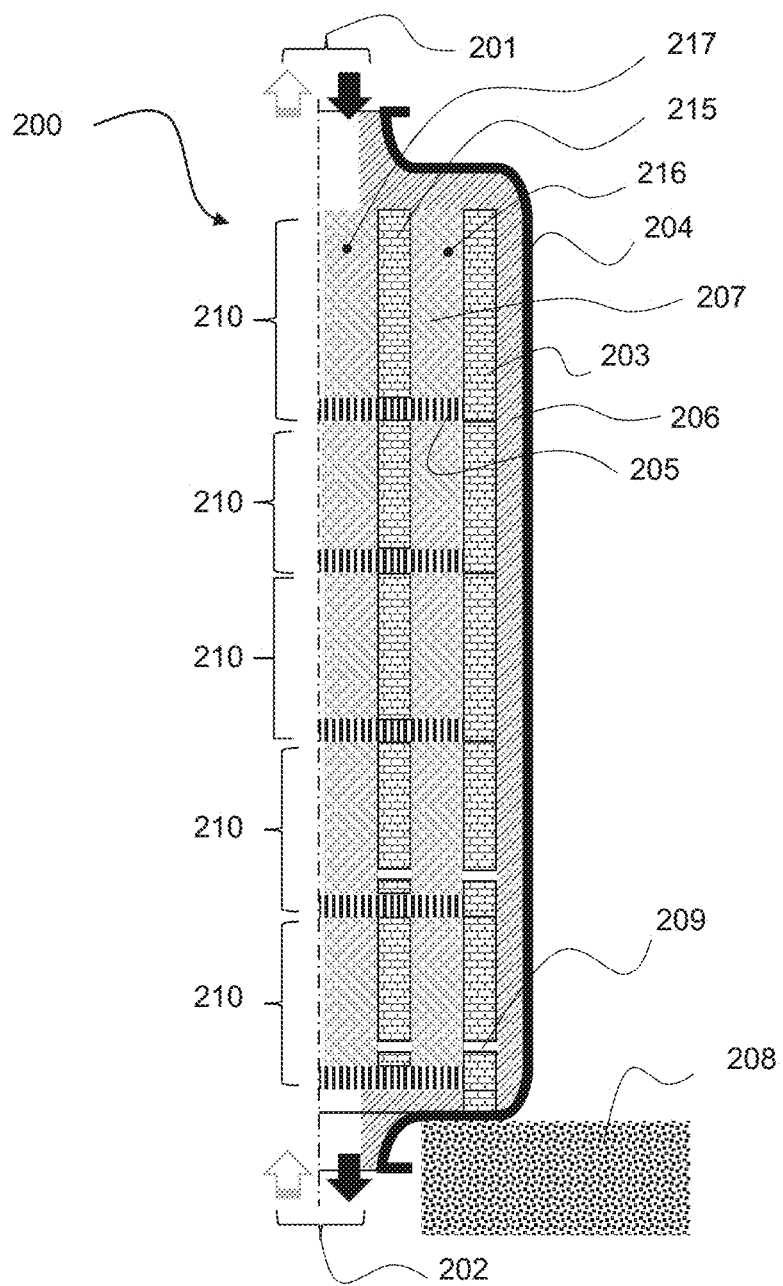
FIG. 2 is a diagram of a TES container in accordance with a first embodiment of the invention, in which the concrete modules of the container comprise a perforated base formed from metal.

FIG. 2 shows a longitudinal diagrammatic section through a TES container in accordance with a first embodiment of the invention. Only half of the container is shown with the other part being symmetrical with it.

The TES container 200 is a vessel which typically has a columnar shape disposed substantially vertically. For example on a support 208 such as the ground, a concrete plinth or any support may support the weight of the container, comprising, preferably at its top and at its base, injection and withdrawal means 201/202 for a gas to be cooled or reheated, typically air. In FIG. 2, the arrows illustrate the movement of gas in the TES container during two distinct operational phases of the container, typically a charging phase (gas compression phase with storage of heat in the TES) and a discharge phase (expansion of gas with heat being restored to the gas) in an AACAES process. The TES container is not limited to a cylindrical geometry for the vessel, but may also have another shape, such as a parallelepipedal shape. A system of pipework (not shown) is provided to place the container in fluid communication with the other devices of the AACAES facility (compressors, turbines, etc) which may in part be located underground.

Figure 5A:
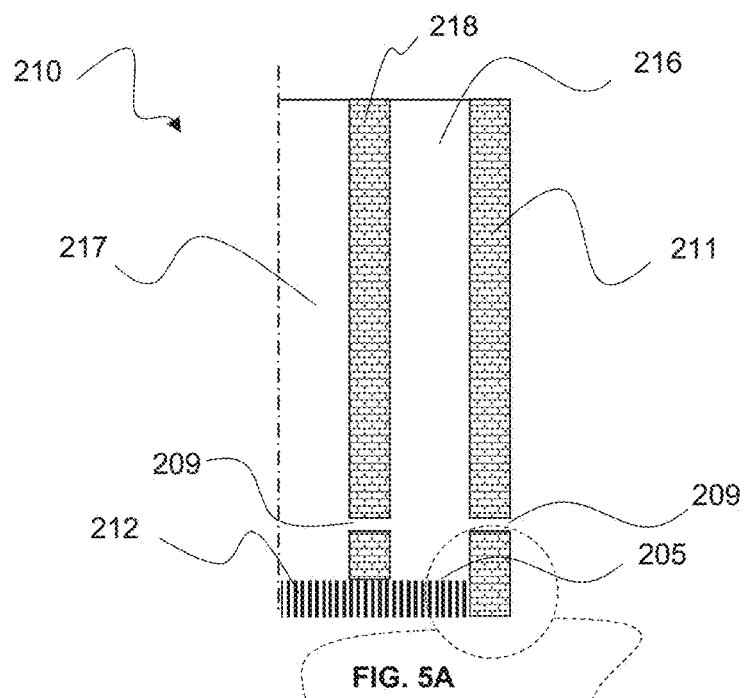
FIG. 5A is a diagram of a module of the TES container in accordance with the first embodiment illustrated in FIG. 2.

The container 200 comprises at least two modules 210 disposed one above the other, and preferably a succession of a plurality of modules 210 disposed one above the other, as can be seen in FIG. 2. As an example, the container in accordance with the invention comprises between 2 and 12 modules 210, preferably between 3 and 5 modules 210. The modules 210 are positioned in a centered manner. The center of each module is on the principal axis extending through the vessel (shown as a dashed line in FIG. 2), and all of the modules are substantially identical. FIG. 5A diagrammatically illustrates such a module 210 in section. As is the case for FIG. 2, only half of the module is shown with the other half being symmetrically identical. Each module 210 comprises two side walls formed from concrete 203 and 215 and a perforated base 205. The first side wall formed from concrete 215 limits a first volume 217 of the module 210 along with the perforated base, and the second side wall formed from concrete 203 delimits a second volume 216 of the module 210, along with the first side wall formed from concrete 215 and the perforated base 205. The module 210 thus comprises two volumes, the second volume 216 surrounding the first volume 217, which are capable of receiving a material for storage and restitution of heat 207 in the form of particles forming a fixed bed of particles in each volume 217 and 216 of the module 210 (not shown in FIG. 5A). The presence of a double jacket formed from concrete means cause forces to be distributed within the structure of the container.

Figure 5B:
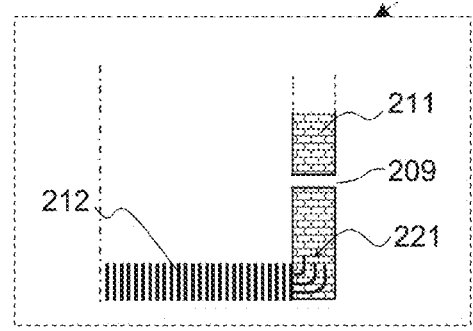
FIGS. 5B and 5C illustrate detail of the module of FIG. 5A
Figure 5C:
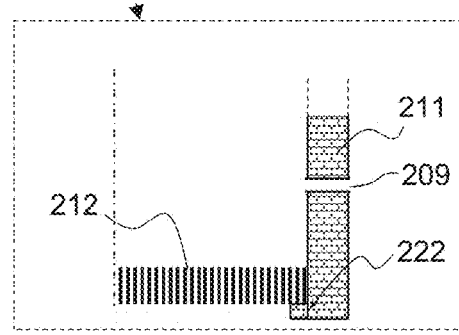

The perforated base 205 of the module 210 is formed from metal in this first embodiment. It may be formed from concrete in other embodiments described below. In accordance with the first embodiment, the perforated base 205 is typically a metal plate comprising openings with a size which is less than that of the particles of heat storage material, in order to retain the heat storage material while allowing the gas to pass into the container. This metal grid 205 is bounded by the second side wall formed from concrete 203, and acts as a support for the first side wall formed from concrete 215. The second side wall formed from concrete 203 may be cast onto the periphery of the metal grid 205 in order to produce an embedded joint 221 (FIG. 5B). Alternatively, the metal grid 205 may rest on a shoulder 222 of the second side wall formed from concrete 211 (FIG. 5C), which facilitates the maintenance operations.

Preferably, the side walls formed from concrete 215 and 203 of the modules have a thickness in the range 50 mm to 500 mm. Preferably, the perforated base 205 formed from metal has a thickness in the range 100 to 300 mm.

Each module 210 preferably has a cylindrical shape, resulting in a container in the shape of a column. In this case, the side walls formed from concrete 215 and 203 are cylindrical. However, the module may have another shape, for example parallelepipedal.

The container 200 thus comprises a plurality of fixed beds (at least four) of particles of heat storage and restitution materials 207, two beds being disposed in one module 210. The term "fixed bed of particles" means an assembly of particles arranged in a random manner, which is neither moving nor fluidized.

The modules 210 form a first jacket formed from concrete 203 of the container 200, as well as a second jacket formed from concrete 215, inside the first jacket 203, that is included in the interior space of the vessel formed by the first jacket 203. More precisely, the first concrete jacket 203 is formed by the assembly of side walls 203 of the modules 210, and the second concrete jacket 215 is formed by the assembly of side walls 215 of the modules 210. The first concrete jacket 203 is surrounded by a thermally insulating layer 206, which is itself surrounded by a steel shell 204. The concrete jacket 203 is in contact with the insulating layer 206, which is itself in contact with the steel shell 204.

The concrete jacket 203 preferably has a thickness in the range 50 mm to 500 mm, for example a thickness of 100 mm. The concrete jacket 203 is capable of containing the storage material which may be at a temperature of up to 300° C., for example a temperature in the range between ambient temperature (20° C.) and 300° C., preferably in the range 20° C. to 260° C. The concrete jacket 203 can also tolerate the loads exerted by the heat storage material, in particular the loads linked to the weight of the storage material, which may be several hundred tons. The storage material and the first concrete jacket 203 are contained in a steel shell 204, separated from the first jacket 203 by the thermally insulating layer 206. The concrete jackets 203, 215 and the insulating layer 206 are not pressure-tight, that is there is no pressure difference either side of each concrete jacket, and of the insulating layer. Thus, the steel shell takes up the internal pressure of the container. The term "internal pressure of the container" means the pressure of the air during operation. In this manner, the pressure of the first jacket 203 is balanced and the steel shell is only subjected to the force due to this internal pressure. The container 200 preferably comprises at least one pressure-equalizing hole 209, which is an opening in the jacket 203 forming a passage between the interior of the vessel and the insulating layer 206, allowing the internal pressure of the vessel to be transmitted to the steel shell 204. Preferably, the container 200 comprises a plurality of pressure-equalizing holes 209, for example disposed in the side walls of each concrete module 210.

The first jacket formed from concrete 203 is principally subjected to compressive forces under moderate temperature conditions, typically of up to approximately 300° C. The side walls of the modules 210 may be constituted by ordinary or high performance concretes (HPC) which can be subjected to this type of loads without significant degradation of their mechanical performances at the envisaged operating temperatures. Refractory concretes and reinforced concretes may also be employed. The thermal conductivity of the concrete jackets 203 is preferably in the range 0.1 to 2 $W \cdot m^{-1} \cdot K^{-}$.

The presence of a double jacket formed from concrete (215 and 203) means that the forces within the structure of the container can be distributed. The double jacket formed from concrete in fact allows the container to resist the mechanical loads exerted by the heat storage material 207 better. The positioning of the jacket 215 may be implemented by means of an abutment carried by the plate 205.

The insulating layer 206 can be used to limit the operating temperature of the steel shell by limiting the transfer of heat. The insulating layer 206 can also be used to facilitate the scaling of the steel shell by authorizing a low strain concerning the temperature, in particular scaling at a temperature which may be 50° C. or less, or close to ambient temperature instead of scaling at the maximum service temperature which is 300° C. The thickness of the insulating layer is preferably such that, in use, the temperature of the steel shell is 50° C. or less. The insulating layer 206 is not pressure-tight. This permeability to pressure allows for pressure-balanced operation because of the transmission of the pressure to the steel shell 204. Preferably, the insulating layer has a porosity such that it is not pressure-tight. The thermal conductivity of the insulating layer 206 is preferably in the range 0.01 to 0.17 $W \cdot m^{-1} \cdot K^{-1}$. The insulating layer 206 preferably has a thickness in the range 50 mm to 400 mm, for example a thickness of 100 mm. The thickness of the insulating layer 206 may be reduced by selecting a refractory concrete in order to form the concrete modules 210 (reduced thermal conductivity of a refractory concrete, typically divided by two compared with an ordinary reinforced concrete). The thickness of the insulating layer also depends on the nature of the material selected to form this layer. The insulating layer is preferably a layer of rock wool. Other materials may also be used in order to form the insulating layer 206, such as perlite, glass wool, cellular glass, an air gap.

The steel shell 204, which constitutes the outer jacket of the container 200, can be used to resist the internal pressure of the container. Its thickness is dependent on the load under pressure. Preferably, the thickness of the steel shell does not exceed 300 mm so as to be compatible with currently known fabrication methods (forging, rolling and welding). The thermal conductivity of the steel shell 204 is preferably in the range 20 to 250 $W \cdot m^{-1} \cdot K^{-1}$. Various steels may be used to fabricate the shell 204. Typically, the shell is formed from non-alloyed general usage steel such as P355GH steel.

The sandwich structure formed by the succession, from the interior to the exterior of the container 200, of the first jacket formed from concrete 203, the insulating layer 206 and the steel shell 204, enables the following:

decoupling of the weight gain stresses of the storage material and the internal pressure. A suitable structure is dedicated to each stress with the weight of the storage material being born by the first concrete jacket 203 (aided by the second concrete jacket 215), and the internal pressure is borne by the steel shell 204;

scaling of the steel shell at ambient temperature because of the insulating layer, thereby enabling the thickness of the steel shell to be reduced, which results in large savings regarding the mass of steel being used, and as a consequence a reduction in costs, compared with scaling for a temperature of the order of 300° C. That also allows thicknesses to be obtained which are compatible with the means for producing the steel shell. In fact, producing a TES container comprising a steel vessel with an operating temperature much higher than 50° C., for example 260° C., for the high pressures envisaged, represents a technical challenge, in particular for a reservoir diameter of more than 1 m. Typically, by using a steel such as those routinely used to produce pressurized equipment (PE), for example a steel of the P355GH type, the thickness of the steel wall reaches a minimum thickness of 150 mm. This constitutes a fabrication limit which complicates shaping of the steel, assembly by welding and also transport, because the mass of the reservoirs could reach several hundred tons;

the production of reservoirs with a bigger diameter, typically of the order of 4 m.

Advantageously, since the modules 210 comprise side walls formed from concrete 218, 211, which is a material which is capable of storing heat from the gas passing through the container, the modules 210 themselves participate actively in storing the heat in the TES container. Thus, it is possible to increase the heat storage capacity of the TES container initially linked to the single heat storage material in the form of fixed beds of particles and/or to reduce the mass of the storage material in the container for the same heat storage capacity.

Thus, the module 210 has several functions, in particular those of forming the vessel of the container, of participating in the storage and restitution of heat, of acting as a support for the granular heat storage material, and of providing a good distribution of the granular heat storage material in the container, which improves the exchanges of heat between the gas and the particles of the storage material with the gas and which prevents settling at the bottom of the container, which could weaken the structure of the container.

The heat storage material is in the form of particles disposed in a manner such as to form two fixed beds in each concrete module 210, namely a fixed bed in each of the volumes 217 and 216 formed in the module 210. The heat storage material is thus a granular material which is capable of storing and restoring heat which, without being limiting, may be a concrete, a ceramic, asbestos or gravel.

The shape and size of the particles may vary, and these parameters are selected in a manner such as to guarantee the passage of air through the bed and of ensuring effective contact between the gas and the particles in order to optimize heat exchanges. Preferably, the particles are substantially spherical, and have a mean diameter in the range 1 to 20 mm.

In accordance with one configuration, the particles of heat storage material are formed from concrete. The use of the same material for the particles and for at least a portion of the modules 210 (the side walls) means that problems linked to differences in thermal expansion between the heat storage material and the modules 210 containing the material are minimized.

The particles, typically beads, of the heat storage material are preferably scaled in a manner to account for the thermal expansion of the particles and the concrete modules during operation of the container, in particular to prevent any blocking phenomena. When the temperature in the vessel increases, the modules expand and, as a consequence, the granular heat storage material can fill out the increase in volume. When a cooling phase occurs, the diameter of the modules decreases and may compress the granular material and thus generate stresses which are harmful to the structure.

As an example, the heat storage material is formed from concrete and in the form of beads with a diameter of 10 mm or more.

The container 200 in accordance with the invention can be used to store heat from a hot gas, storage being carried out by the particles of the heat storage material 207. The container may also be used to restore the heat stored in the particles to a cold gas. The gas enters or leaves the container 200 via its ends, at the level of the injection and withdrawal means 201/202, and exchanges heat with the particles of the material for storage and restitution of heat 207 which are disposed in the form of beds to allow gas to pass through them. The passage of fluid in the fixed bed of particles is substantially axial, that is the fluid generally moves in accordance with the principal axis defined between the inlet and outlet points for the gas in the container 200, typically located at two opposite ends of the container 200. Typically, the gas passes through substantially vertically. In accordance with this configuration, during charging, the entering fluid is hot, at a temperature $T_1$, at the top of the container, and leaves cold (cooled by the particles which store a portion of the heat from the gas), at a temperature $T_2$ ($T_2<T_1$), via the base of the container. For discharge, the gas enters cold, at a temperature $T_2$, via the base of the container, and leaves hot (heated by the particles which restore a portion of the heat of the particles), at a temperature $T_1$, via the top of the container. The configuration described constitutes a preferred configuration in which the container comprises a hot zone in its upper portion, due to the entry of hot gas during the charging phase and the exit of reheated gas during discharge, and a cold zone in the lower portion due to the exit of gas cooled during the charging phase and the entry of cold gas during the discharge phase. A hot zone in the upper portion can in particular be used to minimize the movements of air during a waiting phase before the discharge phase. However, the container may be used in accordance with a reversed configuration, in which the hot zone is in the lower portion and the cold zone is in the upper portion. In this case, during the charging phase, the hot gas to be cooled arrives at a temperature via the bottom of the container and leaves cold, at a temperature $T_2$ ($T_2<T_1$), via the top of the container, and during discharge, the gas enters cold, at a temperature $T_2$, via the top of the container, and leaves hot at a temperature via the bottom of the container.

Advantageously, the TES container in accordance with the invention is capable of operating at pressures in the range 1 bar to 300 bar, in particular in the range 100 bar to 300 bar, and more particularly in the range 100 to 150 bar, and at temperatures in the range between ambient temperature, generally 20° C., and 300° C., preferably between ambient temperature and 260° C.

In accordance with a particular configuration, the TES container does not form a single reservoir, but comprises a plurality of vessels each defined as described above for the vessel of the TES container illustrated in FIG. 2, that is comprising means for injecting and withdrawing gas, preferably at its top and at its base with each vessel being limited by a first jacket formed from concrete surrounded by a thermally insulating layer, and being surrounded by a steel shell. Each vessel comprises at least two modules formed from concrete disposed one above the other in a centered configuration in order to form the first concrete jacket and a second concrete jacket. Each concrete module comprises at least one first volume limited by a first side wall formed from concrete and a perforated base and a second surrounding the first volume and limited by the first side wall, by a second side wall formed from concrete, and by the perforated base. The first and second volumes each contain a fixed bed of particles of a material for storage and restitution of heat. The various vessels are in fluid communication and are assembled in series and/or parallel in order to form a TES container composed of elements with a reduced size and weight. "Series and/or parallel assembly" should be understood to mean with respect to a gas sent to the vessels of the TES container: in an assembly in series, the gas passes in succession through the various vessels of the TES container, while in an assembly in parallel, the stream of gas to be cooled/heated is divided into a plurality of sub-streams each injected into the vessel of the TES container.

The present invention also encompasses a configuration in which each module comprises more than two volumes, for example three or four volumes, which can receive a fixed bed of particles of a material for storage and restitution of heat. In this case, each volume is defined between two side walls formed from concrete, one of the walls surrounding the other. The module then comprises at least three side walls formed from concrete, preferably cylindrical side walls.

The TES container in accordance with the invention is preferably used in an AACAES system as described with respect to FIG. 1. However, the use of the TES container in accordance with the invention is not limited to storing energy by compressed air of the AACAES type. The TES container in accordance with the invention may also be used in other applications in which storage and restitution of heat for a gas are required, under high pressure conditions, for example for use in district heating or in concentrated solar power plants. These various applications require energy storage means if the energy is not consumed during production. As a consequence, the energy available in the form of a flow of heat may be stored in a system for the storage and restitution of heat (TES) in accordance with the invention, comprising at least one container as has been described.

Figure 3:
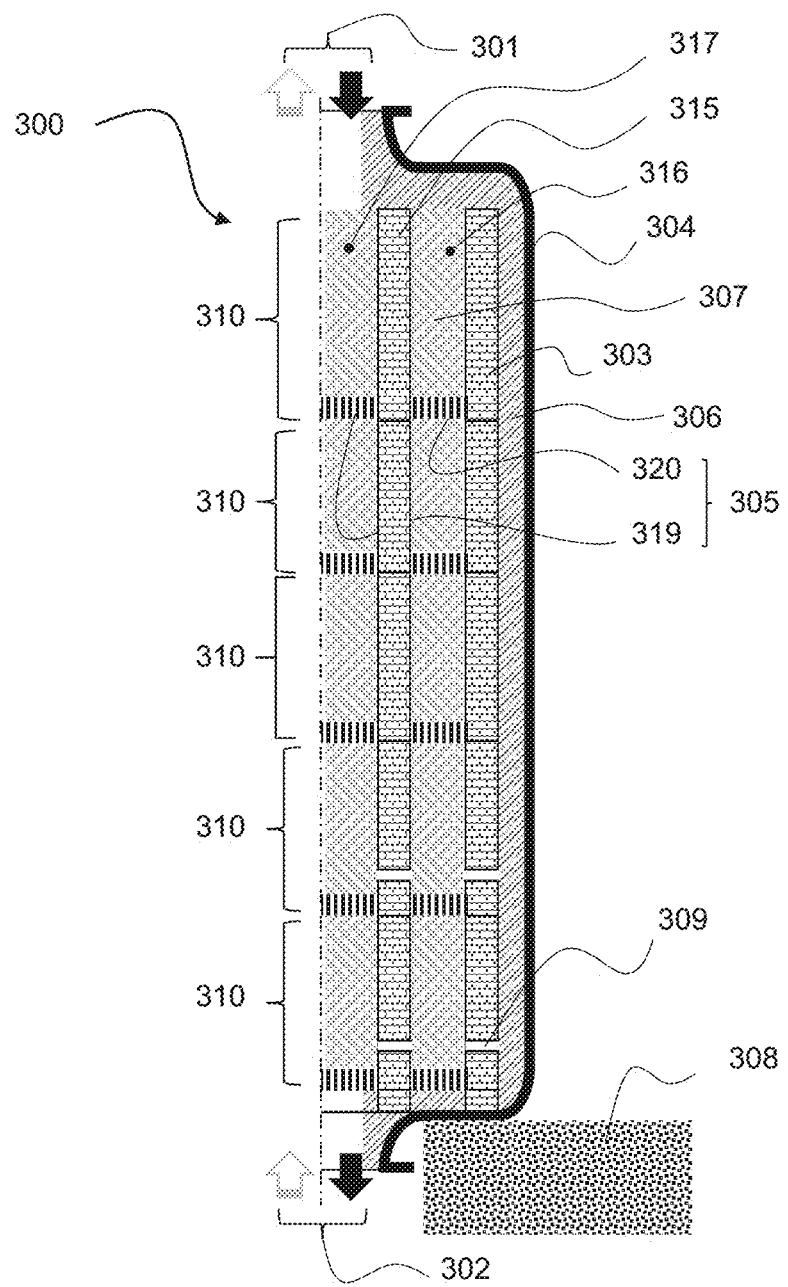
FIG. 3 is a diagram of a TES container in accordance with a variation of the first embodiment of the invention.

A variation of the first embodiment of the TES container in accordance with the invention is illustrated in FIG. 3. Only the modules differ between the first embodiment and this variation. In accordance with this variation, the modules 310, also illustrated in FIG. 6, each comprise a perforated base formed from metal comprising:

a first grid formed from metal 319 bounded by the first side wall formed from concrete 318, and a second grid formed from metal 320 bounded by the first and second side walls formed from concrete 318 and 311.

In the case of cylindrical modules with cylindrical side walls, the first grid formed from metal 319 is in the form of a disk, and the second metal grid is in the form of a ring.

Superimposing the modules 310 in a centered configuration can thus produce the first jacket 303 and the second jacket 315 of the container 300, as is the case for the first embodiment. The second jacket 315 differs from the jacket 215 of the container 200 of the first embodiment illustrated in FIG. 2 in that its entire height is constituted by the concrete of the side walls 318 of the modules 310, while in the case of the container 200 illustrated in FIG. 2, the second jacket formed from concrete 215 can be the to be discontinuous because it is interrupted at various levels over its height by the presence of the single grid of each module 210 which acts to support the side wall formed from concrete 217 of the module 210.

In accordance with this variation, the weight of the side walls 318 of the modules is advantageously not supported by the perforated base 305.

Figure 6:
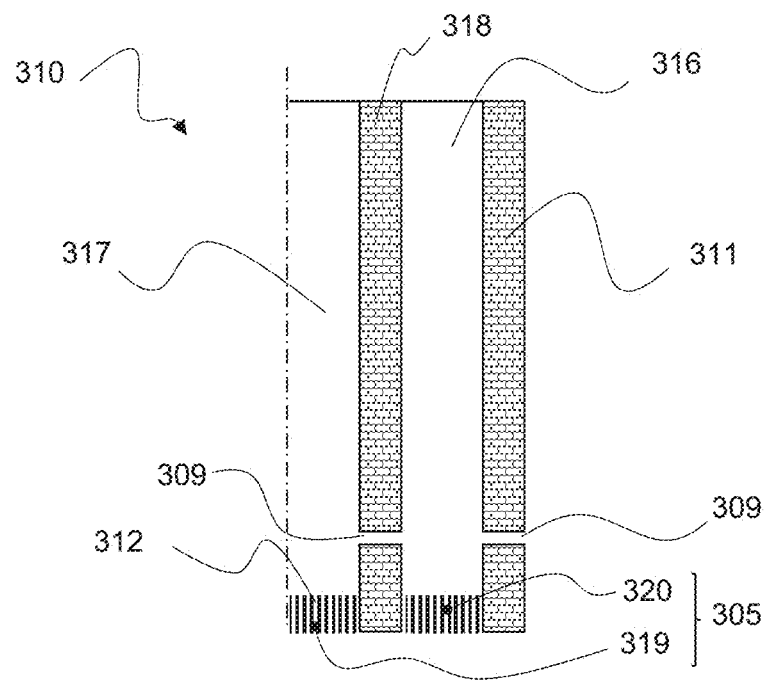
FIG. 6 is a diagram of a module of the TES container in accordance with the variation of the first embodiment illustrated in FIG. 3.
Figure 7:
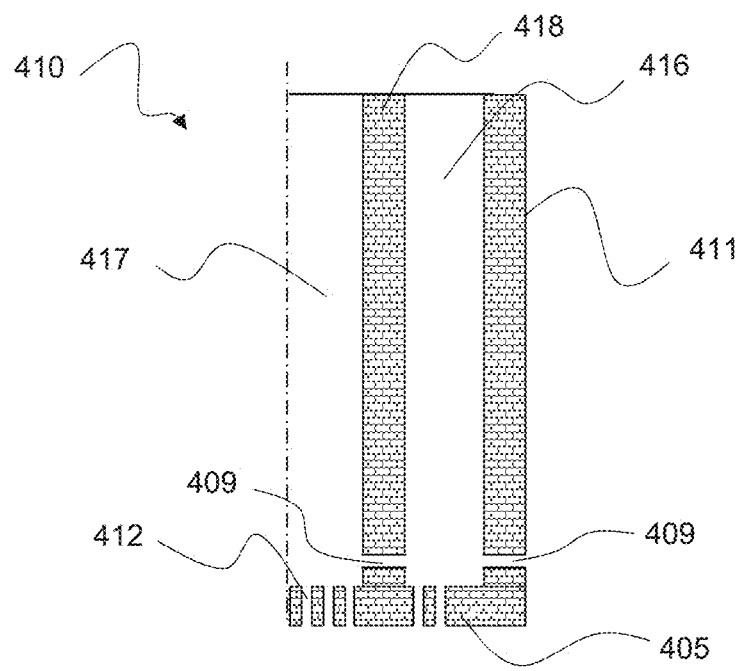
FIG. 7 is a diagram of a concrete module of the TES container in accordance with the second embodiment illustrated in FIG. 4.
Figure 8A:
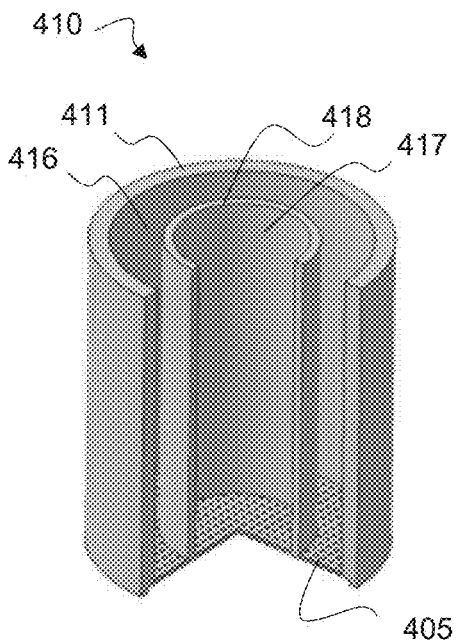
FIGS. 8A and 8B are 3D views of the module formed from concrete illustrated in FIG. 7.
Figure 8B:
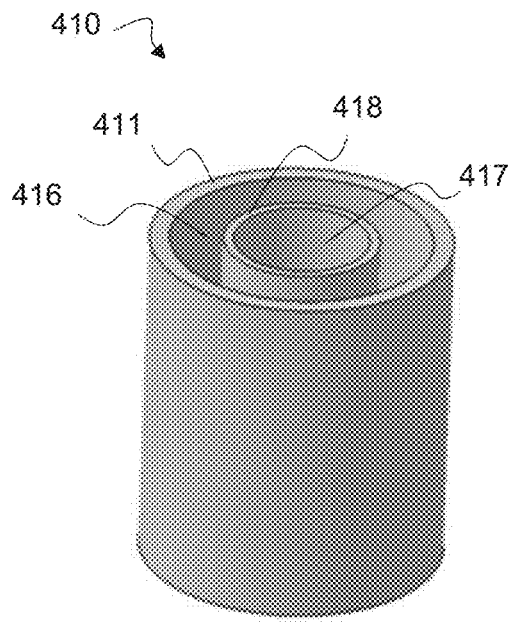

The other elements of the container 300 illustrated in FIGS. 3 and 6 are identical to those of the container 200 illustrated in FIGS. 2 and 5, as well as the associated advantages, and they will not be described again here. In particular, it should be noted that the references 301, 302, 304, 306, 307, 308, 309, 311, 312, 316, 317 designate elements which are identical to those with reference numerals 201, 202, 203, 204, 206 to 209, 211, 212, 216 and 217.

Figure 4:
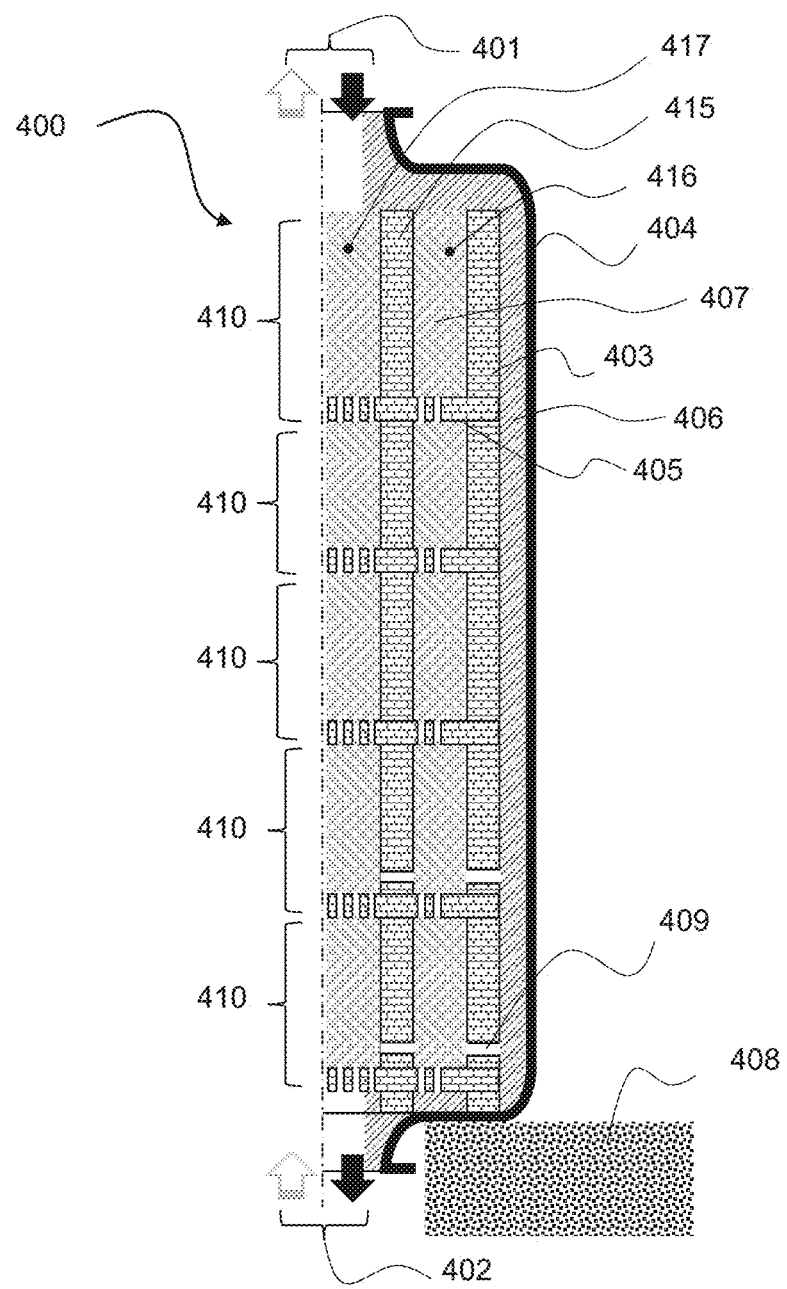
FIG. 4 is a diagram of a TES container in accordance with a second embodiment of the invention, in which the modules of the container comprise a perforated base formed from concrete.

A second embodiment of the TES container in accordance with the invention is illustrated in FIG. 4. Only the modules differ between this second embodiment and the first embodiment (and its variation). In accordance with this second embodiment, the modules 410, also illustrated in FIGS. 7, 8A and 8B, each comprise a perforated base formed from concrete 405. The concretes used as of the same nature as those of the side walls of the modules.

The base 405 of the module 410 is typically a plate formed from concrete comprising openings 412 with a size which is smaller than that of the particles of the heat storage material in order to retain the heat storage material, while allowing gas to pass into the container. The perforated base formed from concrete 405 and the side walls formed from concrete 411 and 418 form three distinct entities, formed by a material of the same nature, that is a concrete. The walls 411 and 418 rest on the concrete plate 405. The portions of the plate 405 supporting the walls 411 and 418 are preferably imperforate, in order to provide a solid thickness of concrete for the jackets 403 and 415 which is at least equal to those of the walls 411 and 418 respectively. As an alternative to the configuration in which the side wall 411 rests on the concrete plate 405, the side wall 411 may comprise a groove in which the periphery of the concrete plate 405 constituting the base of the module 410 is housed (configuration visible in the partial 3D view of module 410 of FIG. 8A). In this case, the portion of the plate 405 which inserts into the groove of the wall 411 is preferably imperforate, in order to provide a solid thickness of concrete which is at least equal to that of the wall 411 at the wall/module base junction.

In the case of cylindrical modules with cylindrical side walls, the concrete plate is in the form of a disk.

Because the modules 410 are formed by side walls and bases constituted by the same material, i.e. concrete, problems with differential thermal expansion which are encountered in prior art devices are overcome.

Furthermore, the modules 410 comprising not only the side walls formed from concrete 418, 411 but also a perforated base formed from concrete 405, the modules 410 themselves participate actively in the storage of heat in the TES container, because concrete is in fact a material which is capable of storing heat from the gas passing through the container. Thus, it is possible to increase even further the heat storage capacity of the TES container, initially linked only to the heat storage material in the form of fixed beds of particles, and/or to reduce the mass of the storage material in the container for the same heat storage capacity.

Furthermore, in the case in which the particles of heat storage material are formed from concrete, the use of the same material for the particles and for the concrete modules 410 means that a substantially identical thermal expansion of the particles and the modules accommodating the particles is ensured, thereby avoiding any supplemental mechanical stresses in the container.

The other elements of the container 400 illustrated in FIGS. 4 and 7, 8A and 8B are identical to those of the container 200 illustrated in FIGS. 2 and 5, along with the associated advantages, and their description will not be repeated here. In particular, it should be noted that the references 401, 402, 404, 406, 407, 408, 409, 411, 412, 416, 417 designate elements which are identical to those with reference numerals 201, 202, 203, 204, 206 to 209, 211, 212, 216 and 217.

Figure 9:
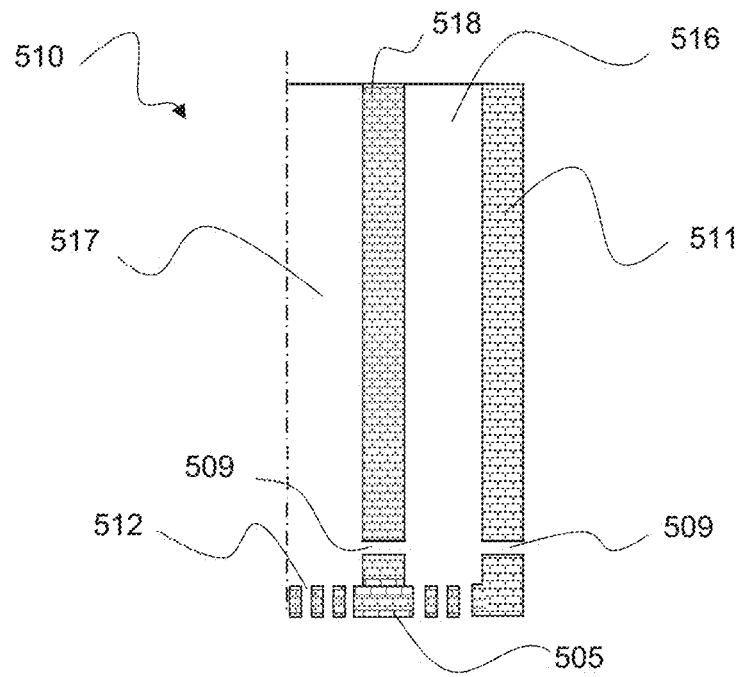
FIG. 9 is a diagram of a concrete module of the IFS container in accordance with a variation of the second embodiment illustrated in FIG. 4.

In accordance with a variation of the second embodiment of the TES container in accordance with the invention, the modules are modules formed from monobloc concrete. One such module formed from monobloc concrete is illustrated in FIG. 9. The concrete module 510 is formed from a single piece of concrete; more precisely, the side wall formed from concrete 511 and the perforated concrete base 505 form a single piece of concrete. The concrete module 510 comprises a side wall 511 which is extended by a perforated base 505 the openings 512 of which can be used to allow the gas to pass through the container. Preferably, the side wall 518 is also formed as one piece with the assembly formed by the perforated base 505 and the side wall 511. As was the case with the concrete module 410, problems with differential expansions are reduced because the material for the base and the walls of the module 510 are of the same nature, and the module 510 itself participates in the storage and restitution of heat for the gas passing through the container.

This configuration is also particularly advantageous for the fabrication of the TES container. In fact, the modules can be pre-fabricated in their entirety, and thus facilitate assembly of the container by stacking up one-piece modules. The modules may also be pre-filled with the heat storage material before assembling them in order to form the container.

Figure 10:
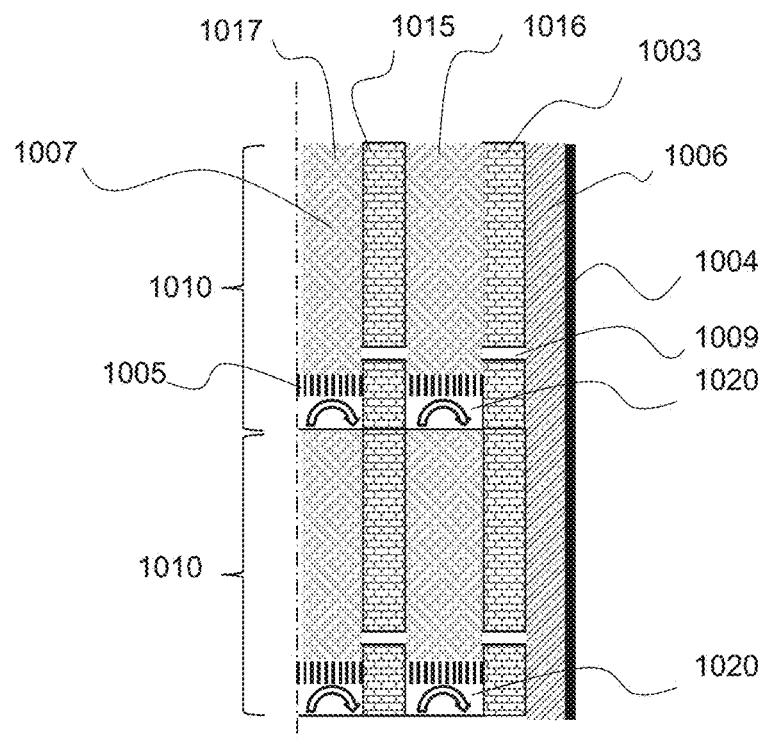
FIG. 10 is a diagram of a portion of a TES container in accordance with a variation of the first embodiment, with modules comprising gas homogenization spaces.

In accordance with a further variation of the first and second embodiments of the container in accordance with the invention, the modules comprise gas homogenization spaces located under the perforated bases. A configuration of this type is illustrated in FIG. 10, in the case of a TES container in accordance with the variation of the first embodiment comprising modules with two metal grids acting as the perforated base. In FIG. 10, two successive modules of the container are shown. The elements with reference numerals 1003, 1004, 1005, 1006, 1007, 1009, 1015, 1016, 1017 designate elements which are identical to those with reference numerals 303, 304, 305, 306, 307, 309, 315, 316, 317. Their descriptions, and their associated advantages, will not be repeated here.

In accordance with this variation, each module 1010 of the TES container comprises a gas homogenization zone 1020 placed under the perforated base 1005 and is empty of any heat storage material 1007. A zone of this type can be used to ensure homogenization of the temperature of the gas at each stage (module) in the container.

Figure 11:
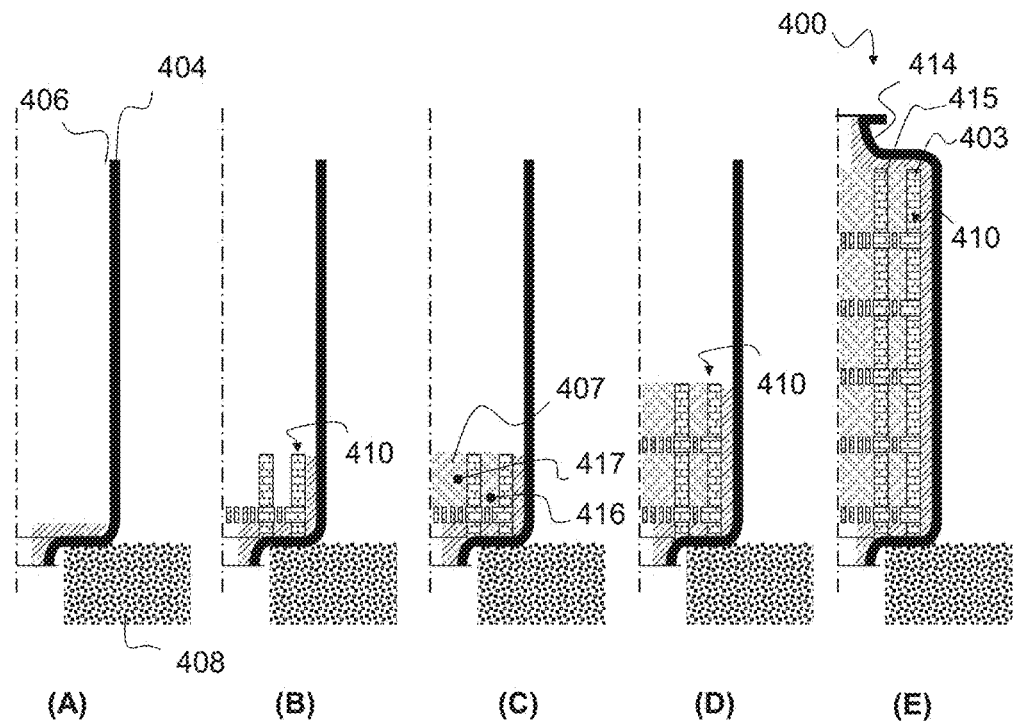
FIG. 11 is a diagram illustrating an example of assembling the TES container represented in FIG. 4.

FIG. 11 illustrates a non-limiting example of assembling the TES container in accordance with the invention. Diagrams (A) to (E) illustrate the succession of steps for assembling the TES container of the invention. The example of a TES container in accordance with the second embodiment illustrated in FIG. 4 is selected in order to illustrate the assembly procedure, this latter being applied to the other embodiments of the TES in accordance with the invention. In accordance with this example of assembly, the steps below are carried out.

A first step (diagram A) for on-site installation of the steel shell 404 without its covering cap 414, and of the insulating layer 406 is carried out. The steel shell may also be described as a casing. The steel shell 404 is deposited on a support 408, for example the ground.

Advantageously, the steel shell is pre-fabricated, that is the sheet-metal work on the shell is carried out in the workshop and it is transported to the assembly site as a single piece. In this case, only the welding or assembly of the cover 414 is carried out at the assembly site after inserting the concrete modules 410 and the heat storage material into the steel shell and placing the insulation between the concrete modules and the steel shell.

Alternatively, the steel shell 404 is divided into a plurality of elements which are transported to the assembly site and assembled on-site by welding.

A second step (diagrams B to C) for assembling the concrete modules, for positioning the insulating layer 406, and for filling the modules with the heat storage material 407 is carried out.

Once the steel shell 404 has been installed, each stage of the container comprising one module is preferably installed as follows, in this order:
- positioning of the concrete module. In particular, the base 405 and the outer wall 418, then the internal wall 418;
- installation of the insulation between the outer concrete wall 418 and the steel shell 404. The insulation may typically be rock wool, loose or on a roll;
- filling the concrete module with the selected storage material 407.

The first concrete module 410 inserted into the steel shell via the open top of the shell 404 will come to rest on the bottom of the shell which has already been thermally insulated.

When assembling successive modules, it is ensured that the modules are centered one with respect to the other as they are being stacked, in order to create a continuous wall of the first jacket formed from concrete 203 and to create the jacket formed from concrete 415.

In accordance with an alternative, the concrete modules 410 may be filled with the heat storage material 207 before installing the insulation 206 between the outer concrete wall 418 and the steel shell 404.

In accordance with another alternative, the concrete modules 410 may be filled with the heat storage material 407 before being inserted into the steel shell 404.

A third step of closing the container 400 is carried out by assembling the shell 404 with its steel cap 414 which has already been thermally insulated, preferably by welding the cover 414 with the steel wall of the shell 404.

Positioning of the other devices, such as the means for injecting and withdrawing gas, has not been detailed because this can readily be carried out by the person skilled in the art.

Figure 13:
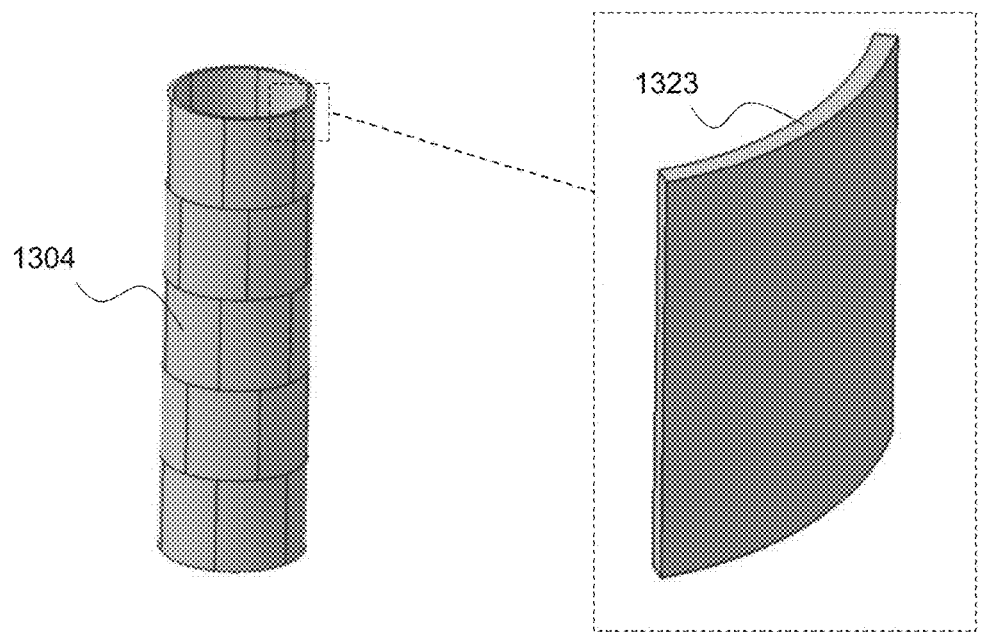
FIG. 13 is a 3D view of a first example of a steel shell of a TES container in accordance with the invention.
Figure 14:
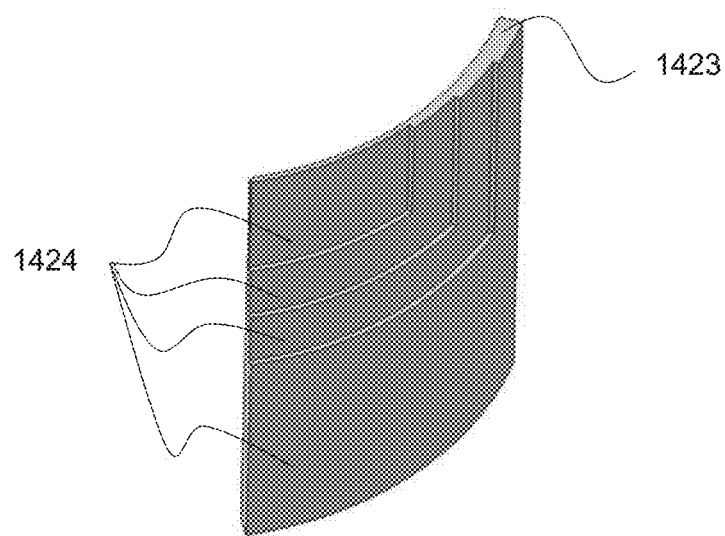
FIG. 14 is a 3D view of a second example of a steel shell of a TES container in accordance with the invention.
Figure 15:
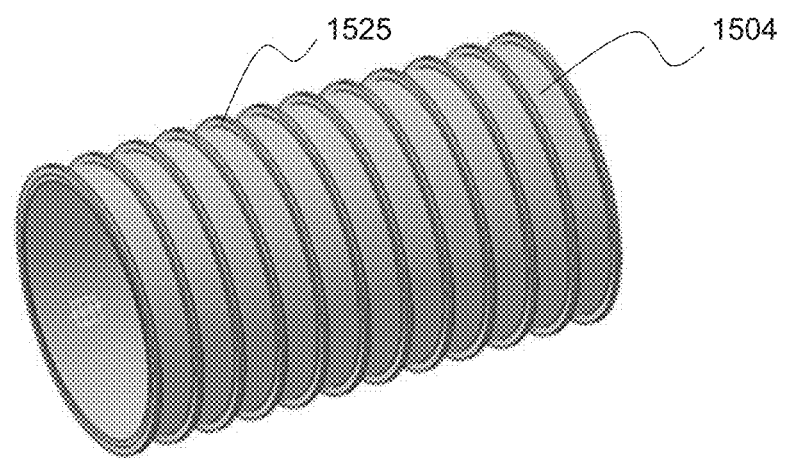
FIG. 15 is a 3D view of a third example of a steel shell of a TES container in accordance with the invention.

The steel shell 404 may be fabricated using a variety of techniques:
- the steel shell may be assembled by welding curved sheets of a single thickness. FIG. 13 illustrates a shell 1304 of this type, composed of welded sheets of a single thickness. The initially flat sheets are curved to the radius of the vessel and are then assembled by welding in order to form the steel shell which has a single-layered wall.
- the steel shell may also be assembled by welding curved sheets into multiple layers in order to work with single thicknesses of sheets which are smaller than the thickness of a sheet used to form a mono-layered shell. A portion of such a shell is illustrated in FIG. 14 where several layers 1424 of sheets can be seen which are superimposed to form the wall 1423 of the steel shell. This technique can be used to facilitate the sheet shaping operation. In accordance with this fabrication technique, the upper layers may be assembled with a pre-tension in order to produce a multi-layered shell with an interference fit on the outer layers. Placing the lower layers under compression means that they can support larger loads or support a similar load for a smaller thickness, which has the advantage of optimizing the quantity of steel necessary for the construction.
- the steel shell may also be fabricated by assembling single thickness curved sheets, preferably by welding, such as in the mono-layered shell illustrated in FIG. 13, which are reinforced with circumferential rings. This technique can be used to obtain a shell with a thinner wall which is resistant to high pressure stresses. FIG. 15 is a 3D drawing illustrating such a shell formed from steel 1504 stiffened by the presence of circumferential rings 1525. The steel shell is cylindrical in shape and comprises a plurality of circumferential reinforcing rings 1525 (12 in number in FIG. 13). The circumferential rings 1525 are preferably produced from metal, in particular from steel.

EXAMPLE

A numerical example concerning a TES container in accordance with the invention used in an AACAES system as shown in FIG. 1 as the last container 43 before passing the gas into the final reservoir 10 (or first container when the gas leaves the reservoir 10) is given below.

A TES container in accordance with the invention comprises, for example, a vessel comprising two volumes formed by two concrete jackets 415 and 403, as can be seen in FIG. 4, having respective diameters of 1.8 m and 3.5 m, and a thickness of 100 mm, and which can tolerate a high temperature of the order of 260° C. The pressure in these concrete walls is balanced because of the holes 409 comprised in them. An insulating layer 406 formed from rock wool with a thickness of 100 mm is placed between the outer concrete jacket 403 and the steel shell 404, allowing the temperature of the steel wall of the shell to be limited to 50° C. The steel shell has an internal diameter of 3.9 m and is 146 mm thick. A TES container of this type develops an internal volume of 672 m$^3$, and can contain 806 tonnes of a storage material having, for example, a density of 2400 kg/m$^3$ with a porosity of 50% (hulk density 1200 kg/m$^3$). Five stages formed by the stack of five concrete modules 410, each 14 m in height, may be provided in order to form the container with a total height of the order of 70 m (this height does not take into account the dimensions of the devices at the base and at the top of the container)

Figure 12:
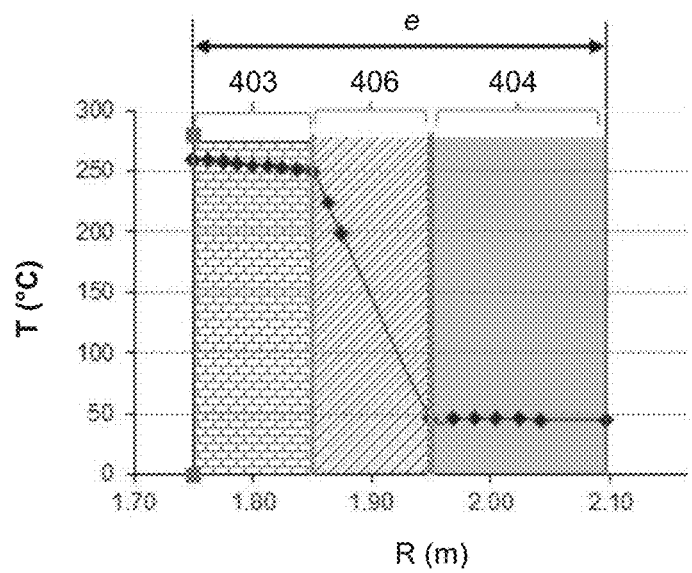
FIG. 12 is a graph illustrating the change in temperature through the multi-layered wall of the TES container illustrated in FIG. 2.

FIG. 12 illustrates the change in temperature (temperature up the ordinate in ° C.) in the multi-layered wall (radius of container along the abscissa in meters) of this example of the TES container in accordance with the invention, the wall being formed by the concrete jacket 403, the insulating layer 406 and the steel shell 404. The total thickness e of the wall of the TES container is 346 mm, respectively with a thickness of the first concrete jacket 403 of 100 mm, a thickness of the insulating layer 406 of 100 mm, and a thickness of the steel shell 404 of 146 mm. It can be seen that with a temperature of 260° C. in the vessel of the container, the temperature in the steel shell 404 has dropped to less than 50° C.

In order to fabricate a TES container of this type, 270 tonnes of concrete and 1000 tonnes of steel are necessary.

The invention claimed is:

1. A heat storage and restitution system, comprising:
a vessel comprising means for injecting and withdrawing a gas to be cooled or heated, the vessel including a first jacket formed from concrete surrounded by a thermally insulating layer, the insulating layer being surrounded by a steel shell, and the vessel comprising at least two modules, wherein each module comprises a first volume limited by a first side wall formed from concrete and a perforated base, a second volume surrounding the first volume which is limited by the first side wall, a second side wall formed from concrete, and by the perforated base;
the first and second volumes being configured for containing a fixed bed of particles of a material for storage and restitution of heat;
each of the modules being disposed one above the other in a centered configuration so that the second side walls of each of the modules forms the first jacket and the first side wall of each of the modules forms a second jacket formed from concrete; and wherein
the first and second jackets are formed from concrete and the insulating layer is not pressure-tight.

2. The system as claimed in claim 1, wherein the perforated base is formed from metal.

3. The system as claimed in claim 2, in which the perforated base of each of the modules comprises a single grid formed from metal bounded by the second side wall formed from concrete, and which supports the first side wall formed from concrete.

4. The system as claimed in claim 2, in which the perforated base of each of the modules comprises a first grid formed from metal bounded by the first side wall formed from concrete and a second grid formed from metal bounded by the first and second side walls formed from concrete.

5. The system as claimed in claim 1, in which the perforated base of each of the modules is formed from concrete.

6. The system as claimed in claim 5, wherein each of the modules is formed from concrete monoblocs.

7. The system as claimed in claim 1, wherein the material for storage and restitution of heat is of particles formed from concrete.

8. The system as claimed in claim 1, is a column, in which first and second side walls of each of the modules formed from concrete are cylindrical.

9. The system as claimed in claim 1, comprising pressure-equalizing holes in the first and second jackets formed from concrete.

10. The system as claimed in claim 1, in which each of the modules further comprises a gas homogenization zone placed below the perforated base which does contain any heat storage material.

11. The system as claimed in claim 1, wherein thermal conductivity ranges:
0.1 to 2 $W \cdot m^{-1} \cdot K^{-1}$ for the jackets formed from concrete,
0.01 to 0.17 $W \cdot m^{-1} \cdot K^{-1}$ for the insulating layer, and
20 to 250 $W \cdot m^{-1} \cdot K^{-1}$ for the steel shell.

12. The system as claimed in claim 1, in which a thickness of the insulating layer has a temperature of the steel shell in use is less equal to or less than 50° C., and in which the insulating layer is selected from a layer of rock wool, perlite, glass wool, cellular glass, an air gap.

13. The system as claimed in claim 1, comprising 2 to 12 modules each formed from concrete.

14. The system as claimed in claim 1, the vessel has a volume ranging from 200 $m^3$ to 1000 $m^3$.

15. The system as claimed in claim 1, comprising a plurality of vessels assembled at least in one of series and parallel.

16. A compressed air energy storage facility (AACAES), comprising:
a compression system for compressing air during a compression phase;
the system for the storage and restitution of heat as claimed in claim 1 for storing heat from the air compressed during the compression phase and for restoring the heat to the compressed air during an expansion phase;
a final reservoir for storing air compressed by the compression system and cooled by the system for the storage and restitution of heat; and
a device for expanding the compressed air obtained from a final storage reservoir during the expansion phase.

17. The facility as claimed in claim 16, in which the final reservoir has a volume ranging from 1000 $m^3$ to 7000 $m^3$ and the vessel of the storage system for the storage and restitution of heat has a volume ranging from 200 $m^3$ to 1000 $m^3$, and the system for the storage and restitution of heat comprises at least three of the vessels.

18. A method for assembling a system as claimed in claim 1, comprising:
installing the steel shell without a covering cap at a container assembly site with the steel shell being disposed on a support;
assembling each of the modules, installing the insulating layer and filling each of the modules with the heat storage material, by successively inserting each of the modules into the steel shell in a centered configuration to form the first jacket and the second jacket; and
closing the system with a thermally insulated steel cap.

19. The method as claimed in claim 18, in which a first volume and a second volume of each of the modules is filled with the heat storage material forming fixed beds of particles after each of the modules has been inserted into the steel shell.

20. The method as claimed in claim 18, in which the first volume and the second volume of each of the modules is filled with the heat storage material forming fixed beds of particles before insertion of each of the modules into the steel shell.

21. The method as claimed in claim 19, wherein the first volume and the second volume of each of the modules is filled with the heat storage material to provide fixed beds of particles before insertion of each of the modules into the steel shell.

* * * * *